United States Patent
Iwatani

(10) Patent No.: US 8,423,267 B2
(45) Date of Patent: Apr. 16, 2013

(54) CETANE NUMBER DETECTION DEVICE AND CETANE NUMBER DETECTION METHOD

(75) Inventor: Kazuki Iwatani, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 387 days.

(21) Appl. No.: 12/669,242

(22) PCT Filed: Jul. 30, 2008

(86) PCT No.: PCT/IB2008/001976
§ 371 (c)(1),
(2), (4) Date: Jan. 15, 2010

(87) PCT Pub. No.: WO2009/016470
PCT Pub. Date: Feb. 5, 2009

(65) Prior Publication Data
US 2010/0191440 A1 Jul. 29, 2010

(30) Foreign Application Priority Data
Jul. 31, 2007 (JP) .................................. 2007-198495

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |
| G01N 33/22 | (2006.01) |
| F02P 5/00 | (2006.01) |

(52) U.S. Cl.
USPC ........ 701/105; 701/103; 73/35.02; 123/406.3

(58) Field of Classification Search .................. 701/103, 701/104, 105; 123/435, 478, 299, 305, 501, 123/294, 406.3, 406.31, 406.32, 406.53; 73/35.02
See application file for complete search history.

(56) References Cited

U.S. PATENT DOCUMENTS

| | | | | |
|---|---|---|---|---|
| 4,722,310 | A * | 2/1988 | Igashira et al. | 123/300 |
| 7,322,341 | B2 * | 1/2008 | Yamaguchi et al. | 123/435 |

(Continued)

FOREIGN PATENT DOCUMENTS

| | | |
|---|---|---|
| JP | 7-091300 A | 4/1995 |
| JP | 2744507 B2 | 2/1998 |

(Continued)

OTHER PUBLICATIONS

H Bauer: "Kraftfahrtechnisches Taschenbuch 24, Auflage", Mar. 15, 2002, Robert Bosch GMBH, Braunschweig/Wiesbasen, XP002514150, p. 277.

(Continued)

*Primary Examiner* — Stephen K Cronin
*Assistant Examiner* — Sherman Manley
(74) *Attorney, Agent, or Firm* — Sughrue Mion, PLLC

(57) ABSTRACT

A cetane number detection device for an internal combustion engine includes: fuel injection devices that injects fuel individually into cylinders; control device that executes injection of fuel from at least one of the fuel injection devices at a predetermined injection timing when the internal combustion engine is started; combustion determination device; and detection device. The combustion state determination device determines whether the state of combustion in the combustion chamber of at least one cylinder into which fuel is injected by the at least one fuel injection device is an ignition state or a misfire state. The detection device detects the cetane number of the fuel on the basis of the state of combustion in the combustion chamber.

10 Claims, 8 Drawing Sheets

U.S. PATENT DOCUMENTS

| | | | |
|---|---|---|---|
| 7,401,591 B2 * | 7/2008 | Yamaguchi et al. | 123/299 |
| 2007/0044759 A1 | 3/2007 | Yamaguchi et al. | |
| 2007/0151542 A1 | 7/2007 | Yamaguchi et al. | |

FOREIGN PATENT DOCUMENTS

| | | |
|---|---|---|
| JP | 2002-201997 A | 7/2002 |
| JP | 2006-016994 A | 1/2006 |
| JP | 2006-188992 A | 7/2006 |
| JP | 2006-226188 A | 8/2006 |
| JP | 2007-154699 A | 6/2007 |

OTHER PUBLICATIONS

Taylor, Charles: "The Internal-Combustion Engine in Theory and Practice vol. 2"; 1985, The Massachusetts Institute of Technology, USA, XP002514151, p. 162.

Chinese Patent Office Action dated Jul. 27, 2012 for CN 200880100822.X and an English-language Translation thereof.

* cited by examiner

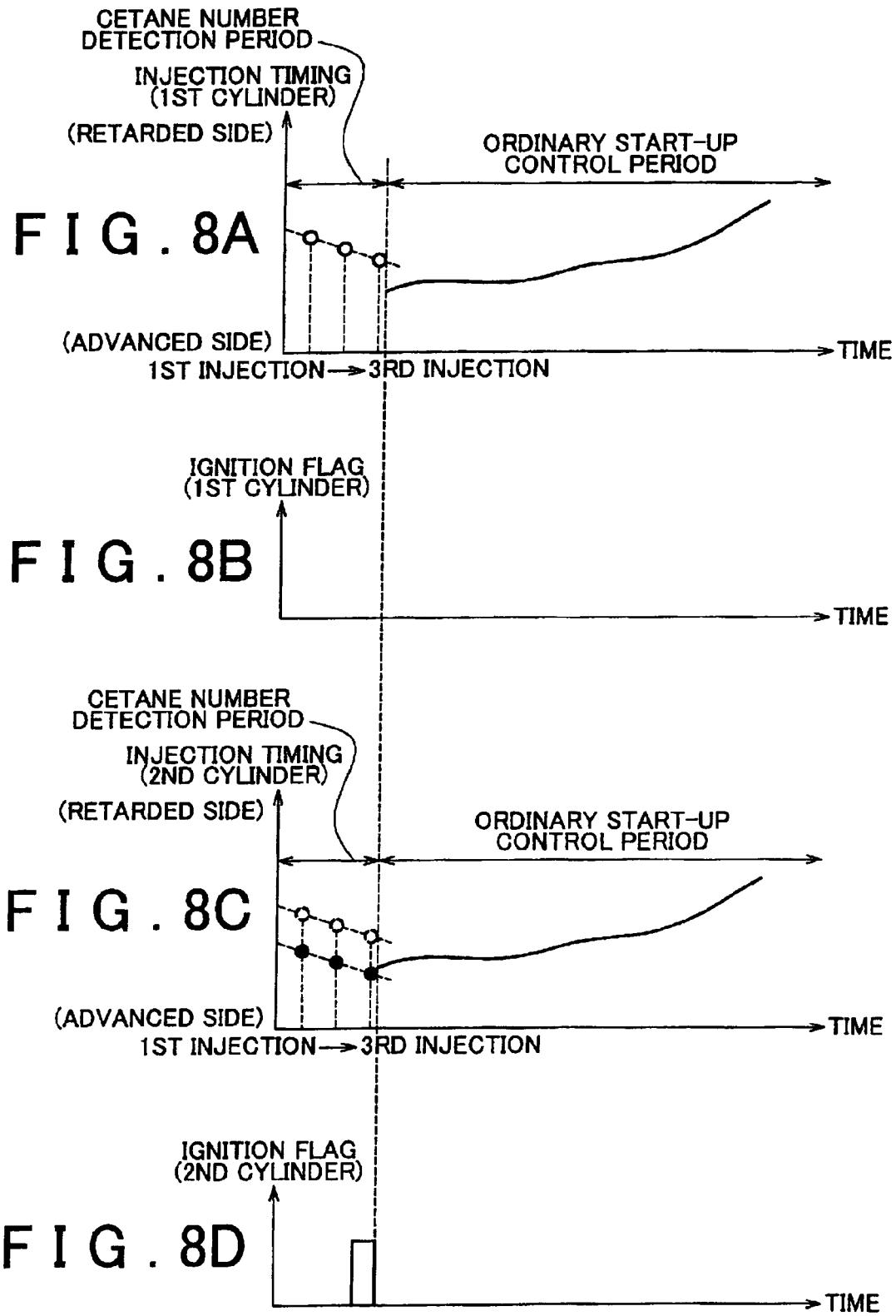

CETANE NUMBER DETECTION DEVICE AND CETANE NUMBER DETECTION METHOD

BACKGROUND OF THE INVENTION

1. Field of the Invention

The invention relates to a cetane number detection device and a cetane number detection method of detecting the cetane number of a fuel in an internal combustion engine, for example, a diesel engine or the like.

2. Description of the Related Art

The fuels used for operation of internal combustion engines vary in ignition quality depending on their cetane numbers. Therefore, technologies related to measurement methods for cetane number, control methods for the amount of fuel injection or the fuel injection timing according to the cetane number, etc. have been proposed.

For example, Japanese Patent Application Publication No. 2006-226188 (JP-A-2006-226188) describes a device that, at every time of start of the engine, determines the presence/absence of refueling and detects the cetane number from a correlation between the rate of heat generation from the combustion of an amount of fuel supplied by pilot injection and the cetane number. Japanese Patent Application Publication No. 2006-16994 (JP-A-2006-16994) describes a device that detects the cetane number from the ignition delay time at the time of a specific operation state. Japanese Patent Application Publication No. 2002-201997 (JP-A-2002-201997) describes a device that determines the cetane number from the coolant temperature at the time of start of the engine and the amount of time it takes to start the engine. Japanese Patent No. 2744507 describes a device that determines whether or not the present fuel is a low-cetane number fuel from an engine rotation speed fluctuation or an engine start rising time. Japanese Patent Application Publication No. 2006-188992 (JP-A-2006-188992) describes a device that detects refueling, and inputs information about the fuel into control means, and then controls the engine.

By the way, when an internal combustion engine is in a fuel-cut state, it is a common practice to execute a fuel injection into a combustion chamber for the purpose of measuring the cetane number, and to detect the cetane number of the fuel on the basis of the ignition timing at which the fuel is ignited. In this method, however, since the measurement of the cetane number cannot be performed until the vehicle decelerates, there is possibility of failing to start the internal combustion engine, for example, if a fuel of low cetane number has been supplied during the present stop of the vehicle.

SUMMARY OF THE INVENTION

The invention provides a cetane number detection device and a cetane number detection method of detecting the cetane number when an internal combustion engine is started.

A first aspect of the invention relates to a cetane number detection device for an internal combustion engine. This cetane number detection device includes: a plurality of fuel injection devices that inject fuel individually into a plurality of cylinders of the internal combustion engine; a control device that executes injection of the fuel from at least one fuel injection device of the plurality of fuel injection devices at a predetermined injection timing when the internal combustion engine is started; a combustion state determination device that determines whether a state of combustion in a combustion chamber of the at least one cylinder into which the fuel is injected from the at least one fuel injection device is an ignition state or a misfire state; and a detection device that detects a cetane number of the fuel based on the state of combustion in the combustion chamber.

According to this cetane number detection device, at the time of start of the internal combustion engine, it can be roughly estimated whether the cetane number of the fuel is greater or smaller than a specific cetane number.

In the foregoing aspect, when it is determined by the combustion state determination device that the state of combustion in the combustion chamber is the misfire state, the control device repeatedly performs a control of advancing the injection timing of the at least one fuel injection device by an amount of a predetermined value and executing injection of the fuel until it is determined by the combustion state determination device that the state of combustion in the combustion chamber is the ignition state, and when it is determined by the combustion state determination device that the state of combustion in the combustion chamber is the ignition state, the detection device detects the cetane number of the fuel based on the injection timing of the at least one fuel injection device. With this construction, the cetane number of the fuel can be accurately detected at the time of start of the internal combustion engine.

According to the foregoing aspect, when it is determined by the combustion state determination device that the state of combustion in the combustion chamber is the ignition state, the control device repeatedly performs a control of retarding the injection timing of the at least one fuel injection device by an amount of a predetermined value and executing injection of the fuel until it is determined by the combustion state determination device that the state of combustion in the combustion chamber is the misfire state, and when it is determined by the combustion state determination device that the state of combustion in the combustion chamber is the misfire state, the detection device detects the cetane number of the fuel based on the injection timing of the at least one fuel injection device. This construction also makes it possible to accurately detect the cetane number of the fuel at the time of start of the internal combustion engine.

In the foregoing aspect, the combustion state determination device determines whether the state of combustion in the combustion chamber is the ignition state or the misfire state regarding each of the plurality of cylinders, and the control device executes injection of the fuel from the plurality of fuel injection devices at respective different predetermined injection timings when the internal combustion engine is started, and when it is determined by the combustion state determination device that the state of combustion in the combustion chamber of each of the plurality of cylinders is the misfire state, the control device repeatedly performs a control of advancing the injection timing of each of the plurality of fuel injection devices by an amount of a predetermined value and executing injection of the fuel until it is determined by the combustion state determination device that the state of combustion in the combustion chamber of any cylinder of the plurality of cylinders is the ignition state, and when it is determined by the combustion state determination device that the state of combustion in the combustion chamber of any cylinder of the plurality of cylinders is the ignition state, the detection device detects the cetane number of the fuel based on the injection timing of the fuel injection device that injects the fuel into the combustion chamber of the cylinder whose state of combustion is the ignition state. With this construction, at the time of start of the internal combustion engine, the determinations at a plurality of injection timings can be performed in one operation, and the cetane number can be detected early.

In the foregoing aspect, the combustion state determination device determines whether the state of combustion in the combustion chamber is the ignition state or the misfire state regarding each of the plurality of cylinders, and the control device executes injection of the fuel from the plurality of fuel injection devices at respective different predetermined injection timings when the internal combustion engine is started, and when it is determined by the combustion state determination device that the state of combustion in the combustion chamber of each of the plurality of cylinders is the ignition state, the control device repeatedly performs a control of retarding the injection timing of each of the plurality of fuel injection devices by an amount of a predetermined value and executing injection of the fuel until it is determined by the combustion state determination device that the state of combustion in the combustion chamber of any cylinder of the plurality of cylinders is the misfire state, and when it is determined by the combustion state determination device that the state of combustion in the combustion chamber of any cylinder of the plurality of cylinders is the misfire state, the detection device detects the cetane number of the fuel based on the injection timing of the fuel injection device that injects the fuel into the combustion chamber of the cylinder whose state of combustion is the misfire state. With this construction, too, at the time of start of the internal combustion engine, the determinations at a plurality of injection timings can be performed in one operation, and the cetane number can be detected early.

A second aspect of the invention relates to a cetane number detection method for an internal combustion engine that includes a plurality of fuel injection devices that inject fuel individually into a plurality of cylinders of the internal combustion engine. This cetane number detection method includes: executing injection of the fuel from at least one fuel injection device of the plurality of fuel injection devices at a predetermined injection timing when the internal combustion engine is started; determining whether a state of combustion in a combustion chamber of the at least one cylinder into which the fuel is injected from the at least one fuel injection device is an ignition state or a misfire state; and detecting a cetane number of the fuel based on the state of combustion in the combustion chamber.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 8A to 8D are graphs showing time-dependent changes regarding the injection timing and the ignition flag.

DETAILED DESCRIPTION OF EMBODIMENTS

Embodiments of the invention will be described hereinafter with reference to the drawings.

First, a construction of an internal combustion engine in accordance with a first embodiment of the invention will be described.

Figure 1:
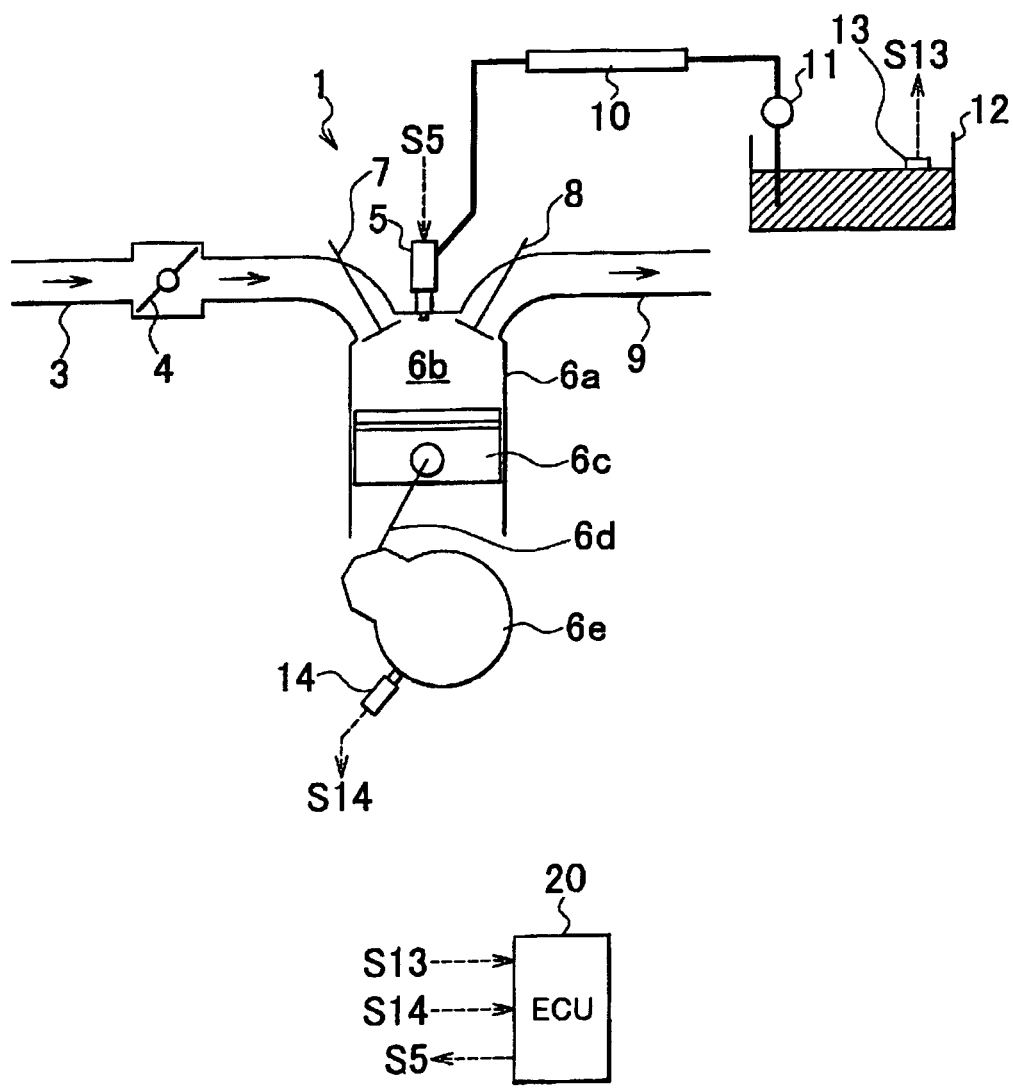
FIG. 1 is a schematic diagram showing a construction of an internal combustion engine to which a cetane number detection device in accordance with a first embodiment of the invention is applied.

FIG. 1 is a schematic diagram showing a construction of an internal combustion engine 1 to which a cetane number detection device in accordance with the first embodiment of the invention is applied. In FIG. 1, solid-line arrows show flows of gas, and broken-line arrows show inputs and outputs of signals.

The internal combustion engine 1 mainly has an intake passage 3, a throttle valve 4, fuel injection valves 5, cylinders 6a, intake valves 7, exhaust valves 8, and an exhaust passage 9. The internal combustion engine 1 is constructed as, for example, a gasoline engine, a diesel engine, or the like. Although FIG. 1 shows only one cylinder 6a for the sake of simple illustration and description, the internal combustion engine 1 actually has a plurality of cylinders 6a, and a plurality of fuel injection valves 5 that inject fuel respectively into the combustion chambers 6b of the cylinders 6a.

Air (intake air) introduced from outside passes through the intake passage 3 conveys, and the throttle valve 4 adjusts the amount of flow of air that passes through the intake passage 3. The air having passed through the intake passage 3 is supplied to the combustion chamber 6b of each cylinder 6a. In addition, the combustion chamber 6b is supplied with fuel that is injected by the fuel injection valve 5. The amount of fuel injection from the fuel injection valve 5, the fuel injection timing of the fuel injection valve 5, etc are controlled on the basis of control signals S5 that are supplied from an ECU 20.

Besides, the internal combustion engine 1 is provided with a fuel tank 12, a fuel pump 11, and a common rail 10. The fuel tank 12 stores fuel. The fuel pump 11 pumps fuel from the fuel tank 12, and supplies it to the common rail 10 after pressurizing the fuel. The common rail 10 supplies high-pressure fuel to each fuel injection valve 5. The fuel injection valve 5 injects the supplied high-pressure fuel into the combustion chamber 6b of the cylinder 6a In the combustion chamber 6b, a mixture of the supplied fuel and air is ignited to burn by spark of an ignition plug (not shown). In this case, the combustion of the mixture causes a piston 6c to reciprocate, and the reciprocating motion is transmitted to a crankshaft 6e via a connecting rod 6d, thereby a crankshaft 6e is rotated. Besides, the exhaust passage 9 is connected to the internal combustion engine 1. The exhaust gas produced by the combustion of the mixture is discharged via the exhaust passage 9. Furthermore, the combustion chamber 6b of the internal combustion engine 1 is provided with the intake valve 7 and the exhaust valve 8. The intake valve 7 is opened and closed to control the communication/disconnection between the intake passage 3 and the combustion chamber 6b. Besides, the exhaust valve 8 is opened and closed to control the communication/disconnection between the exhaust passage 9 and the combustion chamber 6b.

A crank angle sensor 14 is disposed in the vicinity of the crankshaft 6e. The crank angle sensor 14 detects the rotation angle of the crankshaft 6e, and supplies the ECU 20 with a detection signal S14 that corresponds to the detected rotation angle. The fuel tank 12 is provided with a fuel amount sensor 13. The fuel amount sensor 13 is, for example, a float-type fuel amount sensor, and detects the amount of fuel stored in the fuel tank 12, and supplies the ECU 20 with a detection signal S13 that corresponds to the detected amount of fuel.

The ECU (Electronic Control Unit) 20 includes a CPU (Central Processing Unit), a ROM (Read-Only Memory), a RAM (Random Access Memory), etc. (which are not shown). The ECU 20 acquires detection signals from various sensors that are provided for the internal combustion engine 1, and controls the internal combustion engine 1 on the basis of the detection signals. In the cetane number detection device in accordance with the first embodiment, the ECU 20 executes the injection of fuel by at least one fuel injection valve 5 of the fuel injection valves 5 at the time of start of the internal combustion engine 1. Then, the ECU 20 determines whether the state of combustion in the combustion chamber 6b of the cylinder 6a into which fuel is injected by the at least one fuel injection valve 5 is an ignition state or a misfire state, on the basis of the detection signal S14 from the crank angle sensor 14, and then detects the cetane number of the fuel on the basis of the determined state of combustion. Therefore, the ECU 20 functions as a control device, a combustion state determination device, and a detection device in the invention.

Figure 2:
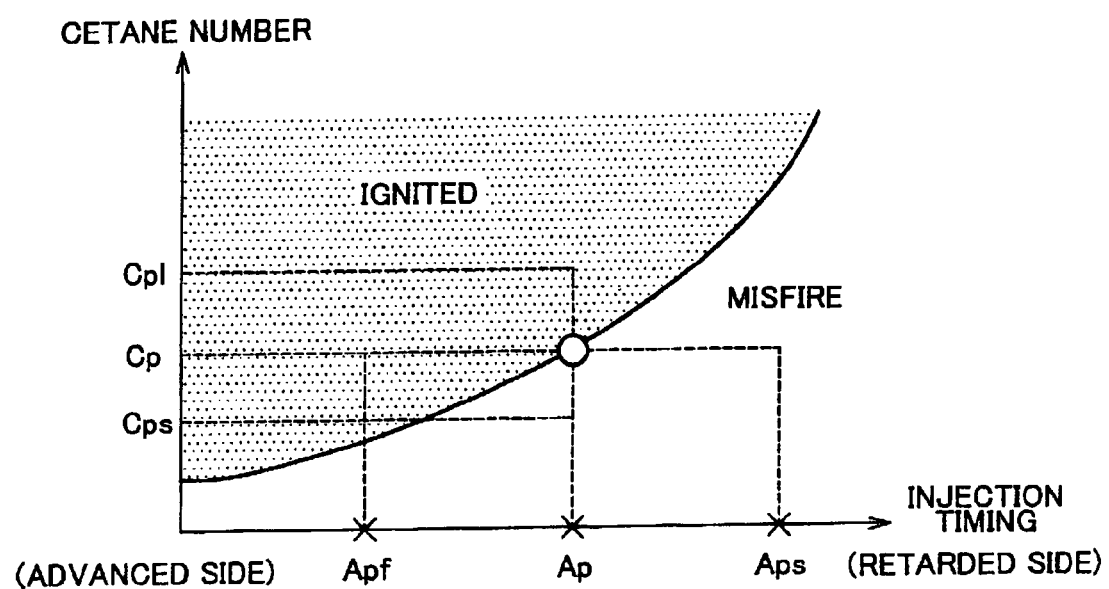
FIG. 2 is a graph showing states of combustion in the combustion chamber of a cylinder in conjunction with the cetane number detection device.

Next, a cetane number detection method in accordance with the first embodiment will be described with reference to FIG. 2. FIG. 2 is a graph showing whether the state of combustion in the combustion chamber of the cylinder 6a is the ignition state and the misfire state, in the cetane number detection device in accordance with the first embodiment.

As shown in FIG. 2, in the case where the cetane number of the fuel is Cp, the state of combustion in the combustion chamber 6b of the cylinder 6 changes from the ignition state to the misfire state or from the misfire state to the ignition state, with the border between the two states being Ap, in accordance with changes in the fuel injection timing. For example, when the injection timing of the fuel injection valve 5 is Aps retarded from Ap in the case where the cetane number of the fuel is Cp, the state of combustion in the combustion chamber 6b of the cylinder 6 is the misfire state. On the other hand, when the injection timing of the fuel injection valve 5 is Apf advanced from Ap in the case where the cetane number of the fuel is Cp, the state of combustion in the combustion chamber 6b of the cylinder 6 is the ignition state.

Besides, in the case where the injection timing is Ap, the state of combustion in the combustion chamber 6b of the cylinder 6 changes from the ignition state to the misfire state or from the misfire state to the ignition state, with the border between the two states being Cp, in accordance with changes in the cetane number. When the cetane number of the fuel is Cp1 (>Cp) in the case where the injection timing of the fuel injection valve 5 is Ap, the state of combustion in the combustion chamber 6b of the cylinder 6 is the ignition state. On the other hand, when the cetane number of the fuel is Cps (<Cp), the state of combustion in the combustion chamber 6b of the cylinder 6 is the misfire state.

That is, the cetane number is an index that indicates the ignition quality, and the injection timing at which the internal combustion engine 1 can be started varies depending on the value of the cetane number. Therefore, in order to reliably start the internal combustion engine 1, it is important to determine the cetane number of the had beforehand.

Therefore, in the cetane number detection device in accordance with the first embodiment, the cetane number of the fuel is detected at the time of starting up the internal combustion engine 1. Firstly, in the ECU 20, a predetermined injection timing is recorded beforehand as an injection timing for detection (hereinafter, referred to as "the detection-purpose injection timing"). When the internal combustion engine 1 is to be started, the injection of the fuel from at least one fuel injection valve 5 of the plurality of fuel injection valves 5 is executed at the detection-purpose injection timing. In the first embodiment, the detection-purpose injection timing is, for example, Ap.

Next, the ECU 20 determines the state of combustion in the combustion chamber 6b of the cylinder ba into which the detection-purpose fuel injection valve 5 injects fuel (hereinafter, referred to as "the detection-purpose combustion chamber"). Concretely, the ECU 20 determines whether the state of combustion in the detection-purpose combustion chamber 6b is the ignition state or the misfire state, on the basis of the detection signal S14 from the crank angle sensor 14.

The ECU 20 detects the cetane number of the fuel on the basis of the state of combustion in the detection-purpose combustion chamber 6b. Concretely, the ECU 20 has a pre-recorded cetane number that is a border value at which the state of combustion in the combustion chamber corresponding to the detection-purpose injection timing changes (if the detection-purpose injection timing is Ap, the cetane number is Cp). In the case where it is determined that the state of combustion in the detection-purpose combustion chamber 6b is the ignition state when fuel is injected at the detection-purpose injection timing as mentioned above, the ECU 20 determines that the cetane number of the fuel is greater than Cp. On the other hand, in the case where it is determined that the state of combustion in the detection-purpose combustion chamber 6b is the misfire state, the ECU 20 determines that the cetane number of the fuel is smaller than Cp. Thus, in the cetane number detection device in accordance with the first embodiment, at the time of start of the internal combustion engine 1, it can be roughly estimated whether the cetane number of the fuel is greater than the specific cetane number Cp, or smaller than the specific cetane number Cp.

As described above, the cetane number detection device in accordance with the first embodiment detects the cetane number of the fuel when the internal combustion engine 1 is started. However, there is not necessarily a need to detect the cetane number of the fuel every time the internal combustion engine 1 is started.

During the state where fuel is stored in the fuel tank 12, the property and the cetane number of the fuel remain substantially unchanged. The cetane number of the fuel changes in the case where the cetane number of a fuel to be fed in is different from the cetane number of the fuel stored in the fuel tank 12.

Figure 3:
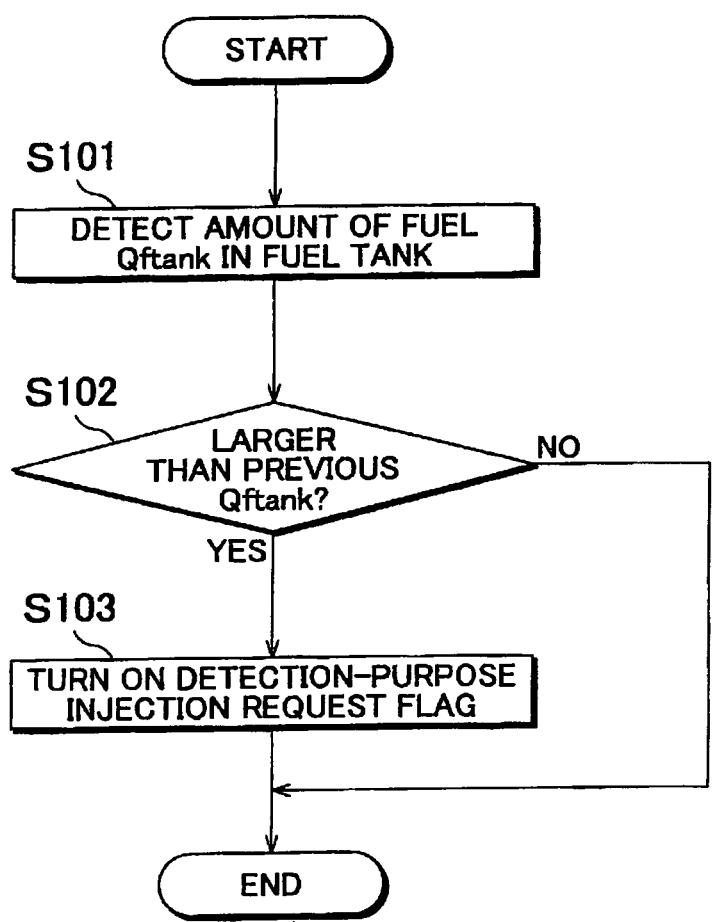
FIG. 3 is a flowchart showing a cetane number detection request determination process.

Therefore, the detection of the cetane number of the fuel is performed exclusively when the internal combustion engine 1 is started immediately after refueling. Concretely, the ECU 20 turns on a request flag for the fuel injection for the purpose of detection of the cetane number only when fuel is fed into the fuel tank 12. A method of the cetane number detection request determination process of determining whether or not to perform the cetane number detection will be concretely described with reference to the flowchart shown in FIG. 3.

Firstly in step S101, the ECU 20 determines the amount of fuel Qftank in the fuel tank 12 on the basis of the detection signal S13 from the fuel amount sensor 13.

Next in step S102, the ECU 20 determines whether or not the determined amount of fuel Qftank is larger than the previously determined amount of fuel Qftank. If it is determined that the presently determined amount of fuel Qftank is not larger than the previously determined amount of fuel Qftank, that is, is equal to the previously determined amount of fuel Qftank or is larger than the previously determined amount of fuel Qftank (NO in step S102), it can be determined that fuel has not been fed into the fuel tank 12, and therefore the ECU 20 ends the process. On the other hand, if it is determined that the presently determined amount of fuel Qftank is larger than the previously determined amount of fuel Qftank (YES in step S102), it can be determined that fuel has been fed into the fuel tank 12, and therefore the ECU 20 turns on the request flag for the fuel injection for the purpose of cetane number detection (step S103), and then ends the process.

Thus, by determining whether or not the request flag for the fuel injection for the purpose of cetane number detection is on, the ECU 20 can determine whether or not fuel has been fed into the fuel tank 12. That is, the ECU 20 can determine whether or not there is possibility of a change having occurred in the cetane number of the fuel.

Figure 4:
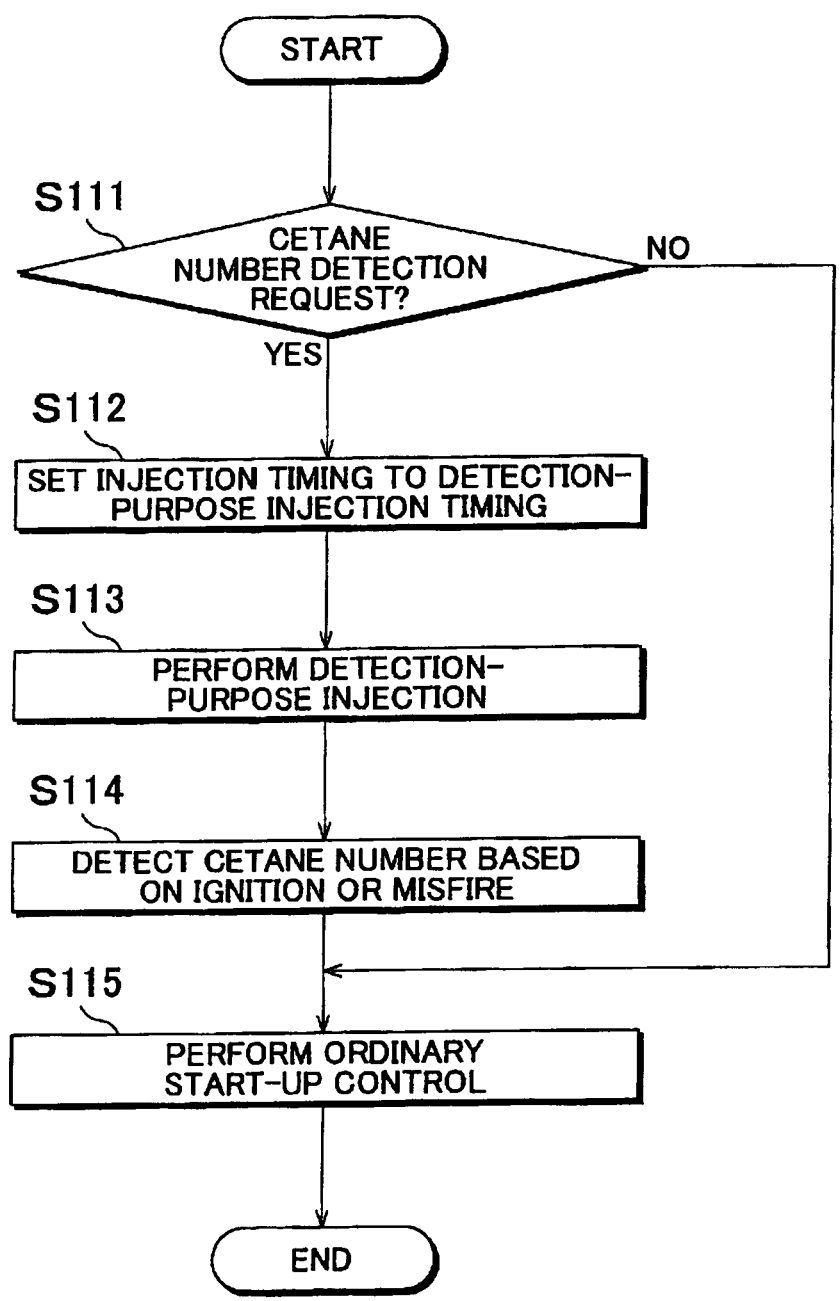
FIG. 4 is a flowchart showing a cetane number detection process in accordance with the first embodiment of the invention.

Next, the cetane number detection process in accordance with the first embodiment will be described with reference to the flowchart shown in FIG. 4.

In step S111, the ECU 20 determines whether or not the request flag for the fuel injection for the purpose of cetane number detection is on at the time of start of the internal combustion engine 1. If it is determined that the request flag for the fuel injection for the purpose of cetane number detection is not on, that is, the request flag for the fuel injection for the purpose of cetane number detection is off (NO in step S111), it can be determined that fuel has not been fed into the fuel tank 12 and therefore the cetane number of the fuel has not changed, and therefore the ECU 20 proceeds to step S115 without performing the detection of the cetane number of the fuel. On the other hand, if it is determined that the request flag for the fuel injection for the purpose of cetane number detection is on (YES in step S111), it can be determined that there is possibility that the cetane number of the fuel has changed, and therefore the ECU 20 proceeds to step S112.

In step S112, the ECU 20 sets a detection-purpose injection timing as the injection timing of the detection-purpose fuel injection valve 5. The detection-purpose injection timing is a value determined beforehand through experiments or the like, and is recorded in the ECU 20. In the foregoing example, the injection timing Ap corresponds to the detection-purpose injection timing.

In step S113, the ECU 20 executes the injection of fuel into the combustion chamber 6b (the detection-purpose combustion chamber) of the cylinder 6a by the detection-purpose fuel injection valve 5 at the detection-purpose injection timing (herein, the injection timing Ap).

In step S114, the ECU 20 determines whether the state of combustion in the detection-purpose combustion chamber 6b is the ignition state or the misfire state, on the basis of the detection signal S14 from the crank angle sensor 14. On the basis of the determined state of combustion, the ECU 20 detects the cetane number. For example, in the case where the detection-purpose injection timing is set at the injection timing Ap, the ECU 20 can determine that the cetane number of the fuel is greater than Cp if the ECU 20 determines that the state of combustion in the detection-purpose combustion chamber 6b is the ignition state. On the other hand, in the case where it is determined that the detected state of combustion in the combustion chamber 6b is the misfire state, the ECU 20 can determine that the cetane number of the fuel is smaller than Cp. In this manner, the ECU 20 can make a rough estimate of the cetane number of the fuel.

In step S115, the ECU 20 performs an ordinary engine start control. If in this step, the ECU 20 has performed detection of the cetane number of the fuel, the ECU 20 corrects the injection timing of all the fuel injection valves 5 at the time of start of the internal combustion engine. For example, in the case where it is determined that the state of combustion in the detection-purpose combustion chamber 6b is the ignition state, the ECU 20 sets the detection-purpose injection timing Ap as the injection timing of all the fuel injection valves 5 at the time of the start of the internal combustion engine. On the other hand, in the case where it is determined that the state of combustion in the detection-purpose combustion chamber 6b is the misfire state, the ECU 20 sets a value advanced by a predetermined value from the detection-purpose injection timing Ap as the injection timing of all the fuel injection valves 5 at the time of the start of the internal combustion engine. The predetermined value as the amount of advancement is a value determined beforehand through experiments or the like, and is recorded in the ECU 20. By operation in this manner, even if a fuel of low cetane number is fed, the state of combustion in the combustion chambers 6b of all the cylinders 6a can be brought to the ignition state at the time of start of the internal combustion engine 1. Thus, reliable start of the internal combustion engine 1 can be achieved. For example, even in the case where as a low-cetane number fuel is fed while the internal combustion engine 1 is in an idling state, the state of combustion in the combustion chamber 6b of each cylinder 6a becomes the misfire state, so that the internal combustion engine 1 stops, the detection of the cetane number and the correction of the injection timing of the fuel injection valves 5 are performed by re-starting the internal combustion engine 1, so that the state of combustion in the combustion chambers 6b of all the cylinders 6a can be brought to the ignition state. Thus, the start of the internal combustion engine 1 can be reliably carried out. In addition, the ECU 20 in accordance with the embodiment does not perform the correction of the injection timing of all the fuel injection valves 5 at the time of start of the internal combustion engine, in the case where the detection of the cetane number of the fuel is not performed.

As described above, in the cetane number detection device in accordance with the first embodiment, the ECU 20 executes the injection of fuel from at least one fuel injection valve 5 (the detection-purpose fuel injection valve) among the plurality of fuel injection valves 5 at a predetermined injection timing (detection-purpose injection timing), when the internal combustion engine 1 is started. Then, the ECU 20 determines whether the state of combustion in the combustion chamber (the detection-purpose combustion chamber) 6b of the cylinder 6a into which fuel is injected by the detection-purpose fuel injection valve 5 is the ignition state or the misfire state, and detects the cetane number of the fuel on the basis of the state of combustion in the detection-purpose combustion chamber 6b. By operation in this manner, the cetane number detection device in accordance with the first embodiment can roughly estimate whether the cetane number of the fuel is larger or smaller than a specific cetane number, at the time of start of the internal combustion engine 1.

Next, a cetane number detection device in accordance with a second embodiment of the invention will be described. The construction of an internal combustion engine in accordance with the second embodiment is the same as that of the internal combustion engine in accordance with the first embodiment shown in FIG. 1.

In the cetane number detection device in accordance with the first embodiment, the ECU 20 executes the injection of fuel by at least one fuel injection valve 5 among the plurality of fuel injection valves 5, that is, at least one detection-purpose fuel injection valve 5, at a predetermined injection timing, at the time of start of the internal combustion engine 1, and determines whether the state of combustion in the combustion chamber (the detection-purpose combustion chamber) 6b of the cylinder 6a into which fuel is injected by the detection-purpose fuel injection valve 5 is the ignition state or the misfire state, and detects the cetane number of the fuel on the basis of the determined state of combustion in the combustion chamber 6b.

However, in the cetane number detection device in accordance with the first embodiment, it is difficult to accurately determine the value of the cetane number of the fuel.

Therefore, in the cetane number detection device in accordance with the second embodiment, if it is determined that the state of combustion in the detection-purpose combustion chamber 6b is the misfire state, the ECU 20 repeatedly performs a control of executing the injection of fuel by advancing the injection timing of the detection-purpose fuel injection valve 5 by the amount of a predetermined value until it is determined that the state of combustion in the detection-purpose combustion chamber 6b is the ignition state. Then, when it is determined that the state of combustion in the detection-purpose combustion chamber 6b is the ignition state, the ECU 20 detects the cetane number of the fuel on the basis of the then injection timing of the detection-purpose fuel injection valve 5.

Figure 5:
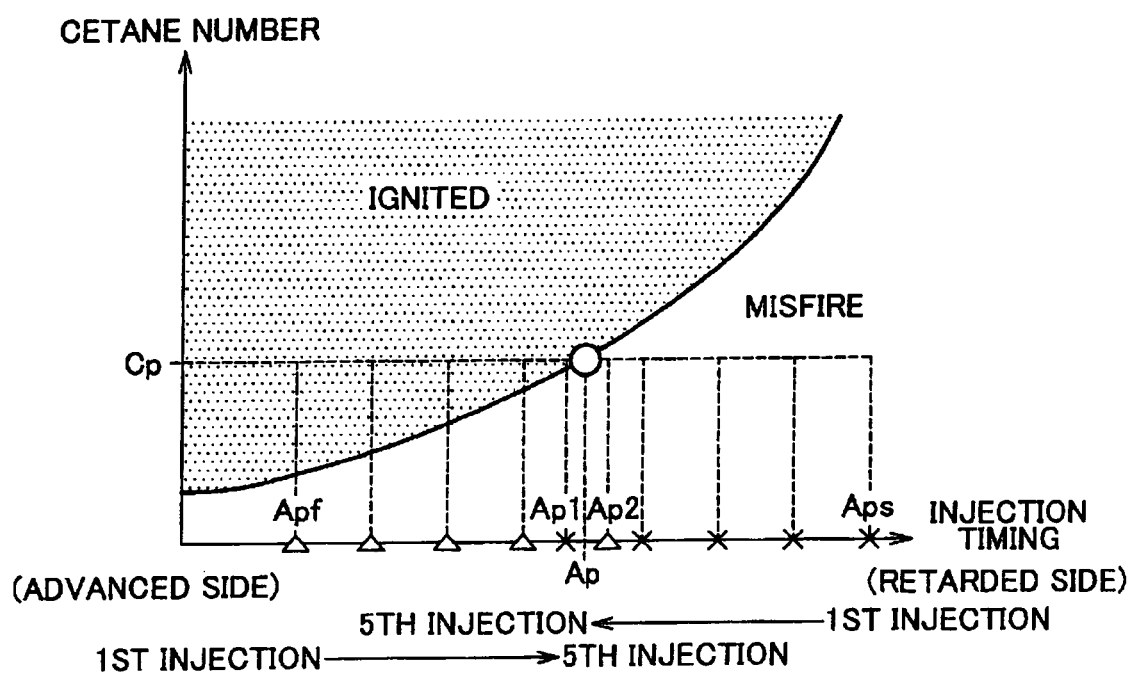
FIG. 5 is a graph showing states of combustion in the combustion chamber of a cylinder in conjunction with the cetane number detection device.

The cetane number detection method in accordance with the second embodiment will be concretely described with reference to FIG. 5. FIG. 5 is an example of a graph showing whether the state of combustion in the combustion chamber of the cylinder 6a is the ignition state or the misfire state in the cetane number detection device in accordance with the second embodiment. In the example shown in FIG. 5, the cetane number of the fuel is assumed to be Cp.

As an example, in the case where at the time of start of the internal combustion engine 1, the ECU 20 sets the detection-purpose injection timing of the detection-purpose fuel injection valve 5 to an injection timing Aps that is retarded from the injection timing Ap and accordingly executes the fuel injection will be considered. In this case, the state of combustion in the detection-purpose combustion chamber 6b is the misfire state, as can be seen from FIG. 5. In the case where it is determined that the state of combustion in the detection-purpose combustion chamber 6b is the misfire state on the basis of the detection signal S14 from the crank angle sensor 14, the ECU 20 advances the injection timing of the detection-purpose fuel injection valve 5 by the amount of a predetermined value, and thus executes the second-time fuel injection. The ECU 20 repeatedly performs the operation of advancing the injection timing of the detection-purpose fuel injection valve 5 by the amount of a predetermined value and thus executing the fuel injection, until it is determined that the state of combustion in the detection-purpose combustion chamber 6b has become the ignition state. FIG. 5 shows the injection timings of the first to fifth fuel injections by x-marks. The predetermined value as the amount of advancement is a value determined beforehand through experiments or the like, and is recorded in the ECU 20.

In the case where at the time of the fifth fuel injection it is determined that the state of combustion in the detection-purpose combustion chamber 6b has become the ignition state on the basis of the detection signal S14 from the crank angle sensor 14, the ECU 20 detects that the cetane number of the fuel is approximately Cp on the basis of the injection timing Ap1. Concretely, the ECU 20 has a map that shows a relation between the injection timing and the value of the cetane number at which the state of combustion in the combustion chamber changes from one to the other of the aforementioned two states at the given injection timing. Using this map, the ECU 20 can detect that the cetane number of the fuel is approximately Cp on the basis of the injection timing Ap1.

That is, in this example, in the case where at the time of start of the internal combustion engine 1, the injection of fuel by the detection-purpose fuel injection valve 5 is performed at the injection timing retarded from the injection timing Ap, the ECU 20 repeatedly performs the operation of advancing the injection timing of the detection-purpose fuel injection valve 5 by the amount of a predetermined value and accordingly performing the injection of fuel, until the state of combustion in the detection-purpose combustion chamber 6b changes from the misfire state to the ignition state. Then, on the basis of the injection timing of the detection-purpose fuel injection valve 5 used as the ignition timing when the state of combustion in the detection-purpose combustion chamber 6b has become the ignition state, the ECU 20 can detect the cetane number of the fuel. By operation in this manner, the ECU 20 can accurately detect the cetane number of the fuel at the time of start of the internal combustion engine.

Incidentally, in the cetane number detection device in accordance with a modification of the second embodiment, it is permissible that in the case where it is determined that the state of combustion in the detection-purpose combustion chamber 6b is the ignition state, the ECU 20 may repeatedly perform the control of retarding the injection timing of the detection-purpose fuel injection valve 5 by the amount of a predetermined value and accordingly executing the injection of fuel, until it is determined that the state of combustion in the detection-purpose combustion chamber 6b is the misfire state, and the ECU 20 may detect the cetane number of the fuel on the basis of the injection timing of the detection-purpose fuel injection valve 5 when it is determined that the state of combustion in the detection-purpose combustion chamber 6b is the misfire state.

As an example, in the case where at the time of start of the internal combustion engine 1, the ECU 20 sets the detection-purpose injection timing of the detection-purpose fuel injection valve 5 to an injection timing Apf advanced from the injection timing Ap and accordingly executes fuel injection will be considered. In this case, as can be understood from FIG. 5, the state of combustion in the detection-purpose combustion chamber 6b is the ignition state. In the case where it is determined that the state of combustion in the detection-purpose combustion chamber 6b is the ignition state on the basis of the detection signal S14 of the crank angle sensor 14, the ECU 20 retards the injection timing of the detection-purpose fuel injection valve 5 by the amount of a predetermined value and accordingly executes the second fuel injection. ECU 20 repeatedly performs the operation of retarding the injection timing of the detection-purpose fuel injection valve 5 by the amount of the predetermined value and accordingly executing fuel injection until it is determined that the state of combustion in the detection-purpose combustion chamber 6b has become the misfire state. In FIG. 5, the injection timings of the first to fifth fuel injections are shown by triangular marks. Incidentally, the predetermined value as the amount of retardation is a value determined beforehand through experiments or the like, and is recorded in the ECU 20.

In the case where at the time of the fifth fuel injection it is determined that the state of combustion in the detection-purpose combustion chamber 6b has become the misfire state on the basis of the detection signal S14 from the crank angle sensor 14, the ECU 20 detects that the cetane number of the fuel is approximately Cp on the basis of the then injection timing Ap2.

That is, in this example, in the case where at the time of start of the internal combustion engine 1, the injection of fuel by the detection-purpose fuel injection valve 5 is performed at the injection timing advanced from the injection timing Ap, the ECU 20 repeatedly performs the operation of retarding the injection timing of the detection-purpose fuel injection valve 5 by the amount of a predetermined value and accordingly performing the injection of fuel, until the state of combustion in the detection-purpose combustion chamber 6b changes from the ignition state to the misfire state. Then, on the basis of the injection timing of the detection-purpose fuel injection valve 5 used as the injection timing when the state of combustion in the detection-purpose combustion chamber 6b has become the misfire state, the ECU 20 can detect the cetane number of the fuel. By operation in this manner, the ECU 20 can also accurately detect the cetane number of the fuel at the time of start of the internal combustion engine.

Figure 6:
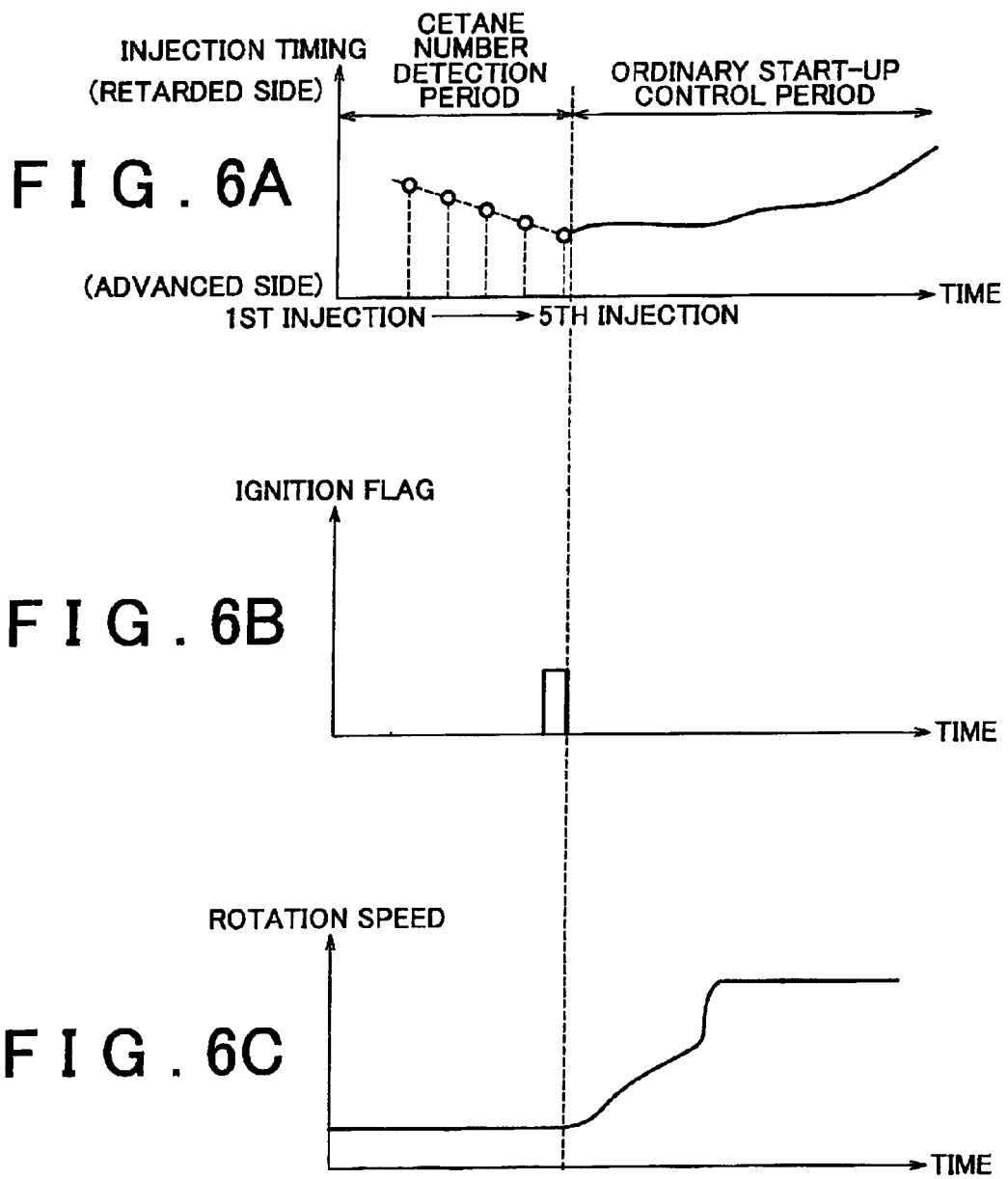
FIGS. 6A to 6C are graphs showing time-dependent changes regarding the injection timing, an ignition flag, and the rotation speed of the internal combustion engine.

FIGS. 6A to 6C are graphs regarding an internal combustion engine in accordance with the second embodiment, showing time-dependent changes in the injection timing, the ignition flag, and the rotation speed of the internal combustion engine 1, respectively. In FIGS. 6A to 6C, the period during which fuel injection is performed by the detection-purpose fuel injection valve 5 at the time of start of the internal combustion engine 1 in order to detect the cetane number is set as a cetane number detection period, and the period during which the ordinary engine start control is performed is set as an ordinary engine start control period. In FIG. 6A, hollow circles show injection timings of the detection-purpose fuel injection valve 5 during the cetane number detection period.

As shown in FIG. 6A, the ECU 20 repeatedly performs the operation of advancing the injection timing of the detection-purpose fuel injection valve 5 by the mount of a predetermined value and accordingly performing fuel injection during the cetane number detection period. Then, since at the time of the fifth fuel injection the ECU 20 determines that the state of combustion in the detection-purpose combustion chamber 6b has become the ignition state, the ECU 20 turns on the ignition flag as shown in FIG. 6B.

Upon detecting that the ignition flag has been turned on, the ECU 20 detects the cetane number on the basis of the injection timing of the detection-purpose fuel injection valve 5. After detecting the cetane number, the ECU 20 performs an ordinary engine start control on the basis of the detected cetane number. Concretely, the ECU 20 also determines the injection timing of the fuel injection valves 5 other than the detection-purpose fuel injection valve 5, on the basis of the detected cetane number, and brings the state of combustion in the combustion chambers 6b of all the cylinders 6a to the ignition state, and gradually raises the rotation speed of the internal combustion engine 1 as shown in FIG. 6C. By operation in this manner, the state of combustion in the combustion chamber 6b can be prevented from becoming the misfire state at the time of start of the internal combustion engine 1, and therefore the reliable start of the internal combustion engine 1 can be achieved.

Figure 7:
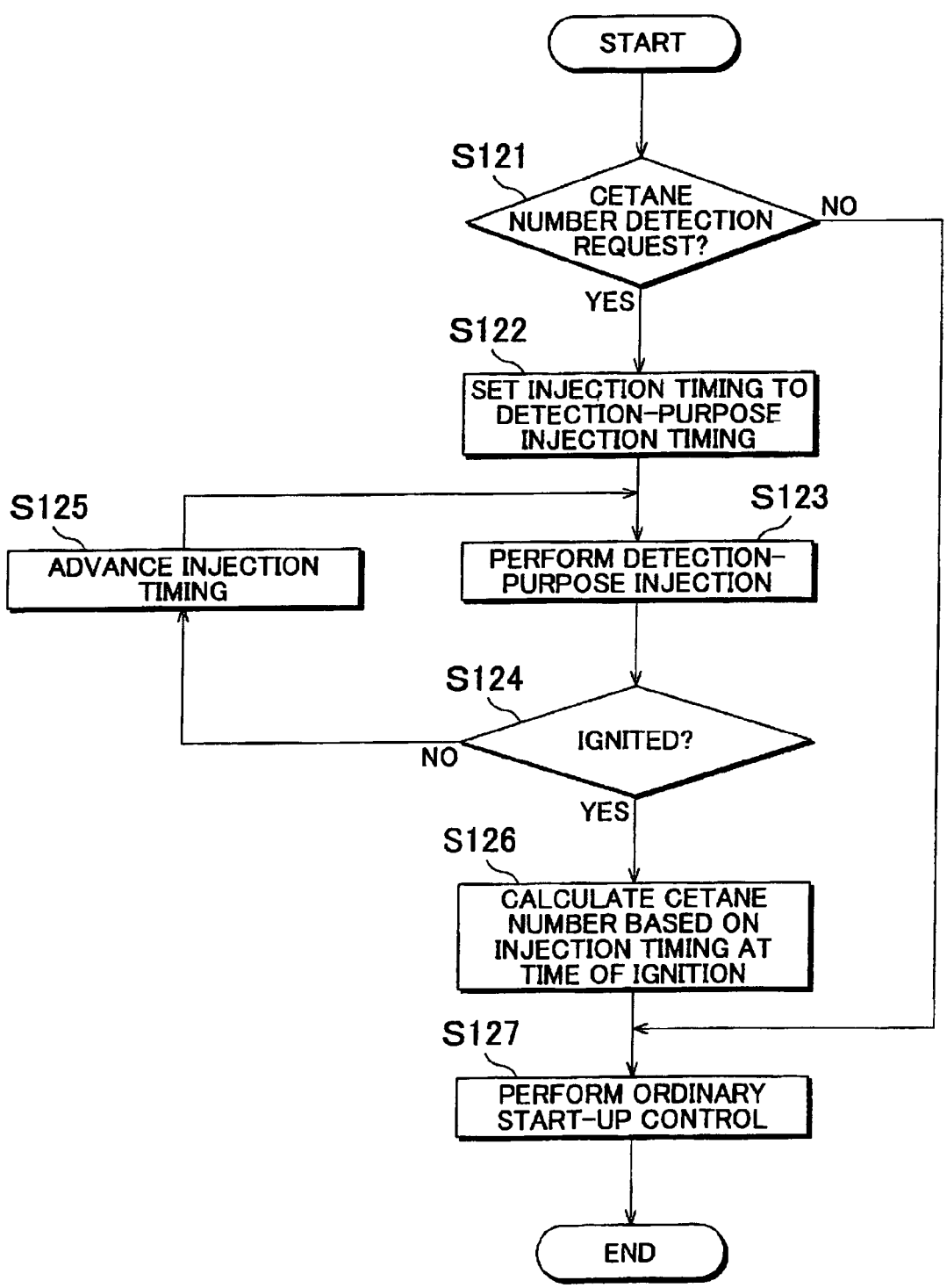
FIG. 7 is a flowchart showing a cetane number detection process in accordance with a second embodiment of the invention.

Next, a cetane number detection process in accordance with the second embodiment will be described with reference to FIG. 7.

In step S121, the ECU 20 determines whether or not the request flag for the fuel injection for the purpose of cetane number detection is on, at the time of start of the internal combustion engine 1. If it is determined that the request flag for the fuel injection for the purpose of cetane number detection is not on, that is, if it is determined that the request flag for the fuel injection for the purpose of cetane number detection is off (NO in step S121), it can be determined that fuel has not been fed into the fuel tank 12 and the cetane number of the fuel has not changed, and therefore, the ECU 20 proceeds to step S127 without performing the detection of the cetane number of the fuel. On the other hand, if it is determined that the request flag for the fuel injection for the purpose of cetane number detection is on (YES in step S121), it can be determined that fuel has been fed into the fuel tank 12 and there is possibility of a change having occurred in the cetane number of the fuel, and therefore the ECU 20 proceeds to step S122.

In step S122, the ECU 20 sets the detection-purpose injection timing as the injection timing of the detection-purpose fuel injection valve 5. The detection-purpose injection timing is a value determined beforehand through experiments or the like, and is recorded in the ECU 20. In the foregoing example, the predetermined injection timing corresponds to the injection timing Aps.

In step S123, the ECU 20 executes the injection of fuel into the combustion chamber 6b (the detection-purpose combustion chamber) of the cylinder 6a from the detection-purpose fuel injection valve 5 at the detection-purpose injection timing (in this case, the injection timing Aps).

In step S124, the ECU 20 determines whether the state of combustion in the detection-purpose combustion chamber 6b is the ignition state on the basis of the detection signal S14 from the crank angle sensor 14. If it is determined that the state of combustion in the detection-purpose combustion chamber 6b is the misfire state (NO in step S124), the ECU 20 sets the value advanced from the present injection timing by the amount of a predetermined value as a new injection timing (step S125), and then performs the operation of step S123 again. On the other hand, if it is determined that the state of combustion in the detection-purpose combustion chamber 6b is the ignition state (YES in step S124), the ECU 20 detects the cetane number of the fuel on the basis of the injection timing of the detection-purpose fuel injection valve 5 (e.g., the injection timing Ap1). By operation in this manner, the ECU 20 can accurately detect the cetane number of the fuel. It is to be noted herein that the predetermined value as the amount of advancement is a value determined beforehand through experiments or the like, and is recorded in the ECU 20.

In step S127, the ECU 20 performs the ordinary engine start control. Concretely, the ECU 20 also determines the injection timing of the fuel injection valves 5 other than the detection-purpose fuel injection valve 5, on the basis of the detected cetane number, and brings the state of combustion in the combustion chambers 6b of all the cylinders 6a to the ignition state, and gradually raises the rotation speed of the internal combustion engine 1. By operation in this manner, the state of combustion in the combustion chamber 6b can be prevented from becoming the misfire state at the time of start of the internal combustion engine 1, and therefore the reliable start of the internal combustion engine 1 can be achieved.

As described above, in the cetane number detection device in accordance with the second embodiment, in the case where it is determined that the state of combustion in the detection combustion chamber 6b is the misfire state (or the ignition state), the ECU 20 repeatedly executes the control of advancing (or retarding) the injection timing of the detection-purpose fuel injection valve 5 by the amount of the predetermined value and accordingly executing fuel injection until it is determined that the state of combustion in the detection combustion chamber 6b is the ignition state (or the misfire state). Then, in the case where it is determined that the state of combustion in the detection combustion chamber 6b is the ignition state (or the misfire state), the ECU 20 detects the cetane number of the fuel on the basis of the injection timing of the detection-purpose fuel injection valve 5. By operation in this manner, the ECU 20 can accurately detect the cetane number of the fuel at the time of start of the internal combustion engine.

Next, a cetane number detection device in accordance with a third embodiment of the invention will be described. The construction of an internal combustion engine in accordance with the third embodiment is substantially the same as that of the internal combustion engine in accordance with the first embodiment shown in FIG. 1. In the internal combustion engine in accordance with the third embodiment, however, crank angle sensors 14 are disposed separately in vicinities of the crankshaft 6e that correspond to the individual cylinders 6a. Therefore, the ECU 20 determines, regarding each of the plurality of cylinders 6a, whether the state of combustion in the combustion chamber 6b is the ignition state or the misfire state, on the basis of the detection signals from the crank angle sensors 14 provided in the vicinities of the crankshaft 6e corresponding to the cylinders 6a.

In the cetane number detection device in accordance with the second embodiment, in the case where it is determined that the state of combustion in the detection combustion chamber 6b is the misfire state (or the ignition state), the control of advancing (or retarding) the injection timing of the detection-purpose fuel injection valve 5 by the amount of a predetermined value and accordingly executing the injection of fuel is repeatedly performed until it is determined that the state of combustion in the detection combustion chamber 6b is the ignition state (or the misfire state). In the case where it is determined that the state of combustion in the detection combustion chamber 6b is the ignition state (or the misfire state), the cetane number of the fuel is detected on the basis of the injection timing of the detection-purpose fuel injection valve 5.

However, in the cetane number detection device in accordance with the second embodiment, it sometimes takes a considerable amount of time for the ECU 20 to obtain the expected change in the state of combustion in the detection-purpose combustion chamber 6b, for example, in the case where the control of repeatedly performing the injection while changing the injection timing of one detection-purpose fuel injection valve 5 is performed. In such a case, it also takes a considerable amount of time to detect the cetane number of the fuel. As a result, there is a tendency of the starting time of the internal combustion engine 1 becoming long.

Therefore, in the cetane number detection device of the third embodiment, the ECU 20 executes the injection of fuel from the plurality of detection-purpose fuel injection valves 5 at their respective different predetermined injection timings at the time of start of the internal combustion engine 1. In the case where it is determined that the state of combustion in the combustion chamber 6b of each of the plurality of cylinders 6a is the misfire state, the ECU 20 repeatedly performs the control of advancing the injection timings of all the detection-purpose fuel injection valves 5 by the amount of a predetermined value and accordingly executing the injection of fuel until it is determined that the state of combustion in the combustion chamber 6b of any one of the cylinders 6a is the ignition state. Then, in the case where it is determined that the state of combustion in the combustion chamber 6b of any one of the cylinders 6a is the ignition state, the ECU 20 detects the cetane number of the fuel on the basis of the injection timing of the detection-purpose fuel injection valve 5 that injects fuel into the combustion chamber 6b of the cylinder 6a whose state of combustion has been determined as being the ignition state.

A cetane number detection method in accordance with the third embodiment will be concretely described with reference to FIGS. 8A to 8D. FIGS. 8A and 8B are graphs showing changes regarding the injection timing and the ignition flag of a first cylinder 6a. FIGS. 8C and 8D are graphs showing changes regarding the injection timing and the ignition flag of a second cylinder 6a. Both the first cylinder 6a and the second cylinder 6a are cylinders 6a into which fuel is injected by detection-purpose fuel injection valves 5. For convenience in description herein, the detection-purpose fuel injection valve 5 that injects fuel into the first cylinder 6a is termed the first detection-purpose fuel injection valve 5, and the detection-purpose fuel injection valve 5 that injects fuel into the second cylinder 6a is termed the second detection-purpose fuel injection valve 5.

In FIG. 8A, hollow circles show the injection timings of the first detection-purpose fuel injection valve 5 during a cetane number detection interval. In FIG. 8C, solid circles show the injection timings of the second detection-purpose fuel injection valve 5 during the cetane number detection interval. In addition, in FIG. 8C, the injection timings of the first detection-purpose fuel injection valve 5 are shown by broken-line hollow circles.

As shown in FIG. 8A, during the cetane number detection period, the ECU 20 repeatedly performs an operation of advancing the injection timing of the first detection-purpose fuel injection valve 5 by the amount of a predetermined value and accordingly performing the injection of fuel. In the example shown in FIG. 8A, the ECU 20 does not detect that the state of combustion in the detection-purpose combustion chamber 6b of the first cylinder 6a has become the ignition state even at the time of the third fuel injection from the first detection-purpose fuel injection valve 5, and therefore does not turn on an ignition flag regarding the first cylinder 6a as shown in FIG. 8B.

As show in FIG. 8C, during the cetane number detection period, the ECU 20 performs an operation of advancing the injection timing of the second detection-purpose fuel injection valve 5 by the amount of the predetermined value and accordingly performing the injection of fuel, simultaneously with the fuel injection from the first detection-purpose fuel injection valve 5. However, the ECU 20 causes the detection-purpose injection timing of the second detection-purpose fuel injection valve 5, that is, the timing of the first-time injection therefrom, to be different from the detection-purpose injection timing of the first detection-purpose fuel injection valve 5, that is, the timing of the first-time injection therefrom. For example, in the example shown in FIG. 8C, the ECU 20 advances the detection-purpose injection timing of the second detection-purpose fuel injection valve 5 in comparison with the detection-purpose injection timing of the first detection-purpose fuel injection valve 5. In addition, the detection-purpose injection timing of each of the first and second detection-purpose fuel injection valves 5 is a value determined beforehand through experiments or the like, and is recorded in the ECU 20. Besides, the predetermined value as the amount of advancement regarding each of the first and second detection-purpose fuel injection valves 5 is a value determined beforehand through experiments or the like, and is recorded in the ECU 20.

Referring to FIG. 8C, as the ECU 20 detects that the state of combustion in the detection-purpose combustion chamber 6b of the second cylinder 6a has become the ignition state at the time of the third-time fuel injection from the first and second detection-purpose fuel injection valves 5, the ECU 20 turns on the ignition flag regarding the second cylinder 6a as shown in FIG. 8D.

Upon detecting that the ignition flag of the second cylinder 6a is turned on, the ECU 20 detects the cetane number on the basis of the then injection timing of the second detection-purpose fuel injection valve 5. Concretely, the ECU 20 has a map that shows a relation between the injection timing and the cetane number that is a border value at which the state of combustion in the combustion chamber corresponding to the injection timing changes, and can detect the cetane number of the fuel on the basis of the injection timing of the second detection-purpose fuel injection valve 5 through the use of this map.

That is, in the example shown in FIGS. 8A to 8D, the ECU 20 executes the injection of fuel by the first detection-purpose fuel injection valve 5 and the second detection-purpose fuel injection valve 5 at their respective different predetermined injection timings at the time of start of the internal combustion engine 1. In the case where it is determined that the state of combustion in the combustion chamber 6b of each of the first cylinder 6a and the second cylinder 6a is the misfire state, the ECU 20 repeatedly performs the control of advancing the injection timings of both the first detection-purpose fuel injection valve 5 and the second detection-purpose fuel injection valve 5 by the amount of a predetermined value and accordingly executing the injection of fuel until it is determined that the state of combustion in the combustion chamber 6b of either one of the first cylinder 6a and the second cylinder 6a is the ignition state. Then, as the ECU 20 determines that the state of combustion in the combustion chamber 6b of the second cylinder 6a, of the first cylinder 6a and the second cylinder 6a, is the ignition state at the time of the third-time fuel injection from the first and second detection-purpose fuel injection valves 5, the ECU 20 detects the cetane number of the fuel on the basis of the injection timing of the second detection-purpose fuel injection valve 5. Thus, by using both the first detection-purpose fuel injection valve 5 and the second detection-purpose fuel injection valve 5, the determinations at the injection timings of the two injection valves can be performed in one operation, and the cetane number can be detected early.

Upon detecting the cetane number, the ECU 20 performs the ordinary engine start control on the basis of the detected cetane number. Concretely, the ECU 20 also determines the injection timings of the fuel injection valves 5 other than the detection-purpose fuel injection valves 5 on the basis of the detected cetane number, and brings the state of combustion in the combustion chamber 6b of each cylinder 6a to the ignition state, and gradually raises the rotation speed of the internal combustion engine 1. This operation also prevents the state of combustion in the combustion chamber 6b from becoming the misfire state at the time of start of the internal combustion engine 1, and therefore can achieve reliable start of the internal combustion engine 1.

Thus, in the cetane number detection device in accordance with the third embodiment, the ECU 20 executes the injection of fuel from a plurality of detection-purpose fuel injection valves 5 at their respective different predetermined injection timings at the time of start of the internal combustion engine 1. In the case where it is determined that the state of combustion in the combustion chamber 6b of each of the plurality of cylinders 6a is the misfire state, the ECU 20 repeatedly performs the control of advancing the injection timing of each of the plurality of detection-purpose fuel injection valves 5 by the amount of a predetermined value and accordingly executing the injection of fuel until it is determined that the state of combustion in the combustion chamber 6b of any of the plurality of cylinders 6a is the ignition state. In other words, the ECU 20 repeatedly performs the operation of advancing the injection timing by the amount of a predetermined value regarding all the plurality of detection-purpose fuel injection valves 5 and accordingly performing the injection of fuel. Then, in the case where it is determined that the state of combustion in the combustion chamber 6b of any of the plurality of cylinders 6a is the ignition state, the ECU 20 detects the cetane number of the fuel on the basis of the injection timing of the detection-purpose fuel injection valve 5 that injects fuel into the combustion chamber 6b of the cylinder 6a whose state of combustion has been determined as being the ignition state. Thus, by using a plurality of detection-purpose fuel injection valves 5, the determinations at a plurality of injection timings can be performed in one operation. Therefore, the cetane number detection device in accordance with the third embodiment can detect the cetane number early at the time of start of the internal combustion engine 1.

A modification of the cetane number detection device in accordance with a modification of the third embodiment may be provided as follows. That is, the ECU 20 executes the injection of fuel from a plurality of detection-purpose fuel injection valves 5 at their respective different predetermined injection timings at the time of start of the internal combustion engine 1. In the case where it is determined that the state of combustion in the combustion chamber 6b of each of the plurality of cylinders 6a is the ignition state, the ECU 20 repeatedly performs the control of retarding the injection timing of each of the detection-purpose fuel injection valves 5 by the amount of a predetermined value and accordingly executing the injection of fuel until it is determined that the state of combustion in the combustion chamber 6b of any of the cylinders 6a is the misfire state. In other words, the ECU 20 repeatedly performs an operation of retarding the injection timing by the amount of a predetermined value and accordingly performing the injection of fuel with regard to all the plurality of detection-purpose fuel injection valves 5. Then, in the case where it is determined that the state of combustion in the combustion chamber 6b of any one of the cylinders 6a is the misfire state, the ECU 20 detects the cetane number of the fuel on the basis of the injection timing of the detection-purpose fuel injection valve 5 that injects fuel into the combustion chamber 6b of the cylinder 6a whose state of combustion has been determined as being the misfire state. Incidentally, the predetermined value as the amount of retardation is a value predetermined beforehand through experiments or the like, and is recorded in the ECU 20. This construction will also make it possible to detect the cetane number early at the time of start of the internal combustion engine 1.

The invention claimed is:

1. A cetane number detection device for an internal combustion engine, the device comprising:
   a plurality of fuel injection devices that inject fuel individually into a plurality of cylinders of the internal combustion engine;
   a combustion state determination device that determines whether a state of combustion in the combustion chamber of each of the plurality of cylinders is the ignition state or the misfire state;
   a control device that executes injection of the fuel from the plurality of fuel injection devices at respective different predetermined injection timings during starting of the internal combustion engine, wherein, if the combustion state determination device determines that, during the starting of the internal combustion engine, the state of combustion in the combustion chamber of each of the plurality of cylinders is the misfire state, then the control device, during the starting of the internal combustion engine, repeatedly performs a control of advancing the injection timing of each of the plurality of fuel injection devices by a predetermined amount and executing injection of the fuel until the combustion state determination device determines that the state of combustion in the combustion chamber of any cylinder of the plurality of cylinders is the ignition state; and a detection device that, if the combustion state determination device determines that the state of combustion in the combustion chamber of any cylinder of the plurality of cylinders is the ignition state, then detects, during the starting of the internal combustion engine, a cetane number of the fuel based on the injection timing of the fuel injection device that injects the fuel into the combustion chamber of the cylinder whose state of combustion is the ignition state.

2. A cetane number detection device for an internal combustion engine, the device comprising:

a plurality of fuel injection devices that inject fuel individually into a plurality of cylinders of the internal combustion engine;

a combustion state determination device that determines whether a state of combustion in the combustion chamber of each of the plurality of cylinders is the ignition state or the misfire state;

a control device that executes injection of the fuel from the plurality of fuel injection devices at respective different predetermined injection timings during starting of the internal combustion engine, wherein, if the combustion state determination device determines that, during the starting of the internal combustion engine, the state of combustion in the combustion chamber of each of the plurality of cylinders is the ignition state, then the control device, during the starting of the internal combustion engine, repeatedly performs a control of retarding the injection timing of each of the plurality of fuel injection devices by a predetermined amount and executing injection of the fuel until the combustion state determination device determines that the state of combustion in the combustion chamber of any cylinder of the plurality of cylinders is the misfire state; and a detection device that, if the combustion state determination device determines that the state of combustion in the combustion chamber of any cylinder of the plurality of cylinders is the misfire state, then, during the starting of the internal combustion engine, detects a cetane number of the fuel based on the injection timing of the fuel injection device that injects the fuel into the combustion chamber of the cylinder whose state of combustion is the misfire state.

3. The cetane number detection device according to claim 1, wherein:

the predetermined injection timing is a timing of injection of the fuel that causes the state of combustion in the combustion chamber to be the ignition state if the cetane number of the fuel is a predetermined cetane number;

the detection device determines that the cetane number of the fuel is smaller than the predetermined cetane number in response to the combustion state determination device determining that the state of combustion in the combustion chamber is the misfire state; and the detection device determines that the cetane number of the fuel is greater than or equal to the predetermined cetane number in response to the combustion state determination device determining that the state of combustion in the combustion chamber is the ignition state.

4. The cetane number detection device according to claim 2, wherein:

the predetermined injection timing is a timing of injection of the fuel that causes the state of combustion in the combustion chamber to be the ignition state if the cetane number of the fuel is a predetermined cetane number;

the detection device determines that the cetane number of the fuel is smaller than the predetermined cetane number in response to the combustion state determination device determining that the state of combustion in the combustion chamber is the misfire state; and the detection device determines that the cetane number of the fuel is greater than or equal to the predetermined cetane number in response to the combustion state determination device determining that the state of combustion in the combustion chamber is the ignition state.

5. The cetane number detection device according to claim 1, further comprising:

a crank angle sensor that detects a crank angle of a crankshaft of the internal combustion engine, wherein:

the combustion state determination device determines whether the state of combustion in the combustion chamber is the ignition state or the misfire state based on the crank angle detected by the crank angle sensor.

6. The cetane number detection device according to claim 2, further comprising:

a crank angle sensor that detects a crank angle of a crankshaft of the internal combustion engine, wherein:

the combustion state determination device determines whether the state of combustion in the combustion chamber is the ignition state or the misfire state based on the crank angle detected by the crank angle sensor.

7. The cetane number detection device according to claim 1, further comprising:

a fuel amount detection device that detects a fuel amount of the fuel stored in a fuel tank of the internal combustion engine, wherein:

the detection device detects the cetane number of the fuel in response to the fuel amount detected by the fuel amount detection device being increased from a previous fuel amount.

8. The cetane number detection device according to claim 2, further comprising:

a fuel amount detection device that detects a fuel amount of the fuel stored in a fuel tank of the internal combustion engine, wherein:

the detection device detects the cetane number of the fuel in response to the fuel amount detected by the fuel amount detection device being increased from a previous fuel amount.

9. A cetane number detection method for an internal combustion engine including a plurality of fuel injection devices that inject fuel individually into a plurality of cylinders of the internal combustion engine, the method comprising:

determining whether a state of combustion in the combustion chamber of each of the plurality of cylinders is the ignition state or the misfire state;

executing injection of the fuel from the plurality of fuel injection devices at respective different predetermined injection timings during starting of the internal combustion engine;

if, during the starting of the internal combustion engine, it is determined that the state of combustion in the combustion chamber of each of the plurality of cylinders is the misfire state, then, during the starting of the internal combustion engine, repeatedly performing a control of advancing the injection timing of each of the plurality of fuel injection devices by a predetermined amount and executing injection of the fuel until it is determined that the state of combustion in the combustion chamber of any cylinder of the plurality of cylinders is the ignition state; and if it is determined that the state of combustion in the combustion chamber of any cylinder of the plurality of cylinders is the ignition state, then, during the starting of the internal combustion engine, detecting a cetane number of the fuel based on the injection timing of the fuel injection device that injects the fuel into the combustion chamber of the cylinder whose state of combustion is the ignition state.

10. A cetane number detection method for an internal combustion engine including a plurality of fuel injection devices that inject fuel individually into a plurality of cylinders of the internal combustion engine, the method comprising:

determining whether a state of combustion in the combustion chamber of each of the plurality of cylinders is the ignition state or the misfire state;

executing injection of the fuel from the plurality of fuel injection devices at respective different predetermined injection timings during starting of the internal combustion engine;

if, during the starting of the internal combustion engine, it is determined that the state of combustion in the combustion chamber of each of the plurality of cylinders is the ignition state, then, during the starting of the internal combustion engine, repeatedly performing a control of retarding the injection timing of each of the plurality of fuel injection devices by a predetermined amount and executing injection of the fuel until it is determined that the state of combustion in the combustion chamber of any cylinder of the plurality of cylinders is the misfire state; and if it is determined that the state of combustion in the combustion chamber of any cylinder of the plurality of cylinders is the misfire state, then, during the starting of the internal combustion engine, detecting a cetane number of the fuel based on the injection timing of the fuel injection device that injects the fuel into the combustion chamber of the cylinder whose state of combustion is the misfire state.

* * * * *